(12) United States Patent
Takemoto et al.

(10) Patent No.: US 9,650,168 B2
(45) Date of Patent: May 16, 2017

(54) THREAD MATERIAL CUTTING DEVICE

(75) Inventors: Tomohiro Takemoto, Toyama (JP);
Nobuhito Yamauchi, Toyama (JP);
Takeo Yamamura, Toyama (JP);
Mitsunori Saitoh, Osaka (JP);
Yoshiyuki Tsuji, Osaka (JP)

(73) Assignees: OHKI CO., LTD., Osaka-shi (JP);
TSUBAKIMOTO KOGYO CO., LTD., Osaka-shi (JP); FABRICA TOYAMA CORPORATION, Kanazawa-shi (JP)

( * ) Notice: Subject to any disclaimer, the term of this patent is extended or adjusted under 35 U.S.C. 154(b) by 305 days.

(21) Appl. No.: 14/352,971

(22) PCT Filed: Oct. 31, 2011

(86) PCT No.: PCT/JP2011/075121
§ 371 (c)(1),
(2), (4) Date: Apr. 18, 2014

(87) PCT Pub. No.: WO2013/065118
PCT Pub. Date: May 10, 2013

(65) Prior Publication Data
US 2014/0262049 A1 Sep. 18, 2014

(51) Int. Cl.
*B65B 29/04* (2006.01)
*B65D 85/812* (2006.01)
(Continued)

(52) U.S. Cl.
CPC .............. *B65C 7/00* (2013.01); *B65B 9/2056* (2013.01); *B65B 29/04* (2013.01); *B29C 65/02* (2013.01);
(Continued)

(58) Field of Classification Search
CPC ... B65B 29/04; B32B 37/02; B32B 2305/026; B32B 2309/16; B32B 2439/06
See application file for complete search history.

(56) References Cited

U.S. PATENT DOCUMENTS

| 5,511,359 A | 4/1996 | Kenney |
| 5,632,132 A * | 5/1997 | Kuipers .................. B65B 29/04 426/79 |
| 5,689,936 A | 11/1997 | Kenney |
| 5,873,216 A | 2/1999 | Appelbe et al. |

FOREIGN PATENT DOCUMENTS

| GB | 1105076 A | 3/1968 |
| GB | 1381799 A | 1/1975 |

(Continued)

OTHER PUBLICATIONS

Feb. 25, 2015 Extended European Search Report issued in EP Application No. 11875181.7.
(Continued)

*Primary Examiner* — Linda L Gray
(74) *Attorney, Agent, or Firm* — Oliff PLC

(57) ABSTRACT

A thread material cutting device is provided which is used in an extraction bag sheet manufacturing apparatus. The thread material cutting device has tension application means such as a pressing plate configured to engage with the thread material placed between adjacent tags so as to apply tension to the thread material. While the welding means is press-heating the thread material onto the tags, the tension application means applies tension to the thread material so as to cut the thread material.

3 Claims, 13 Drawing Sheets

(51) Int. Cl.
    *B32B 37/02*     (2006.01)
    *B32B 38/04*     (2006.01)
    *B65C 7/00*     (2006.01)
    *B65B 9/20*     (2012.01)
    *B32B 38/00*     (2006.01)
    *B29C 65/08*     (2006.01)
    *B65D 85/808*     (2006.01)
    *B29C 65/02*     (2006.01)

(52) U.S. Cl.
    CPC ............... *B29C 65/08* (2013.01); *B32B 37/02* (2013.01); *B32B 38/004* (2013.01); *B32B 38/1875* (2013.01); *B65D 85/808* (2013.01); *B65D 85/812* (2013.01); *Y10T 156/1077* (2015.01); *Y10T 156/1097* (2015.01); *Y10T 156/133* (2015.01); *Y10T 156/1326* (2015.01); *Y10T 156/1343* (2015.01); *Y10T 156/1378* (2015.01)

(56) References Cited

FOREIGN PATENT DOCUMENTS

| | | |
|---|---|---|
| JP | A-9-502146 | 3/1997 |
| JP | A-2001-519729 | 10/2001 |
| JP | A-2002-134347 | 5/2002 |
| JP | A-2004-170252 | 6/2004 |
| JP | A-2010-064769 | 3/2010 |
| WO | 92/14649 A1 | 9/1992 |
| WO | WO 2009/141867 A1 | 11/2009 |
| WO | WO 2009/141870 A1 | 11/2009 |
| WO | 2010/029651 A1 | 3/2010 |
| WO | 2011/061859 A1 | 5/2011 |

OTHER PUBLICATIONS

Dec. 27, 2011 International Search Report issued in International Patent Application No. PCT/JP2011/075121.

* cited by examiner

THREAD MATERIAL CUTTING DEVICE

TECHNICAL FIELD

The present invention relates to a thread material cutting device for use in a manufacturing apparatus for extraction bag sheets.

BACKGROUND ART

Tea bags of black tea, green tea, herb tea and the like, as well as extraction bags of soup such as dried sardine and dried bonito are made from a water filter sheet such as a nonwoven fabric and the like. The water filter sheet is formed into bag bodies in the shape of flat bags, tetrahedrons, or the like, each of the bag bodies is filled with extraction materials such as tea leaves and a hanging thread with a tag is bonded to the outer surface of the bag body so as to be used as the bags.

An extraction bag sheet for use in manufacturing such extraction bags is formed from a belt-like water filter sheet, on which a hanging thread with a tag for one extraction bag is repeatedly arranged in a longitudinal direction of the sheet at prescribed intervals. As an extraction bag sheet manufacturing apparatus which manufactures extraction bag sheets with high productivity, there is known an apparatus which arranges tags at prescribed intervals on a belt-like water filter sheet in the longitudinal direction of the sheet and arranges a long thread material so as to be placed over each of the tags (Patent Literatures 1 and 2).

The extraction bag sheet manufacturing apparatus manufactures extraction bag sheets by holding tags on a peripheral face of a rotary carrier at prescribed intervals, forming a long thread material into a continuous winding pattern on the rotary carrier so that the thread material is placed over those tags, welding the tags and the thread material together on the rotary carrier, then feeding a water filter sheet onto the rotary carrier, and welding the tags or the thread material to the water filter sheet.

The extraction bag sheet is applied to a packing machine, where both side-edge portions of the sheet are sealed (vertical sealing) together in the longitudinal direction to form a cylindrical body, and welding/melt-cutting (horizontal sealing) of the cylindrical body in a width direction and filling of contents are alternately repeated to manufacture extraction bags. In this case, if horizontal sealing is repeated in the same direction, flat bag-type extraction bags are obtained, whereas if the sealing is performed with the direction of the cylindrical body being repeatedly changed by 90 degrees on the plane vertical to the longitudinal direction of the cylindrical body, then tetrahedral extraction bags are obtained.

The thus manufactured extraction bags of both the flat-bag type and the tetrahedral type are configured so that the thread material and the water filter sheet are welded together on the upper and lower transverse seal portions of the extraction bags. Accordingly, in order to prepare an extraction bag to be used with the bag body of the extraction bag being hung with a hanging thread, it is necessary to strip the thread material from a transverse seal portion near the tag.

Meanwhile, with a recent increase in environmental consciousness, water filter sheets and/or thread materials made of biodegradation plastic have come to be used for extraction bags.

However, when extraction bags are manufactured from a water filter sheet and/or a thread material made from biodegradable plastic as described in the foregoing, the water filter sheet and the thread material are firmly welded. This causes the problem in that the water filter sheet is torn when the thread material is stripped from the transverse seal portion at the time where the extraction bag is used.

As a solution to such a problem, the thread material in the extraction bag sheet may be removed in advance from a horizontal seal formation portion where the thread material needs to be taken off at the time when the extraction bag is used. As a method for removing the thread material in a production line of the extraction bags, there is known a method in which cutting the thread material with use of a cutter, lifting the thread material, and cutting the thread material are performed in sequence (Patent Literature 3). This method may also be applied to manufacturing of extraction bag sheets.

CITATION LIST

Patent Literature

Patent Literature 1: WO2009/141867A1
Patent Literature 2: WO2009/141870A1
Patent Literature 3: Japanese Translation of PCT Patent Application Publication No. Hei. 9-502146

SUMMARY OF INVENTION

Technical Problem

However, in the extraction bag sheet manufacturing apparatus, securing three processing positions for cutting, lifting and cutting of the thread material requires upsizing of the apparatus. Moreover, cutting with use of a cutter also requires maintenance due to abrasion of a cutting edge, which causes an increased manufacturing cost of the extraction bag sheets.

Under these circumstances, an object of the present invention is to provide a thread material cutting device capable of being incorporated into an extraction bag manufacturing apparatus with a compact apparatus configuration without use of a cutter, and an extraction bag manufacturing apparatus having such a thread material cutting device incorporated therein.

Solution to Problem

The present inventor has found the followings. In an extraction bag sheet manufacturing apparatus including welding means in which tags retained on a carrying face at prescribed intervals and a thread material arranged to have a specified continuous pattern so as to be placed over the tags are sequentially press-heated and are thereby welded on a carrier, the thread material which has been easy to melt-cut is easily cut by application of tension to the thread material at the time of welding the tags and the thread material. Moreover, to implement the cutting of the above, the conventional extraction bag sheet manufacturing apparatus including the welding means may be provided with means that applies tension to the thread material, so that a compact configuration can be achieved.

That is, the present invention relates to a thread material cutting device for use in an extraction bag sheet manufacturing apparatus including welding means in which tags retained on a carrying face of a carrier at prescribed intervals and a thread material arranged so as to be placed over the tags are welded on the carrier, the thread material cutting device including tension application means configured to engage with the thread material placed between adjacent tags so as to apply tension to the thread material, wherein while the welding means is welding the thread material to the tags, the tension application means applies tension to the thread material so as to cut the thread material.

The present invention also provides an extraction bag sheet manufacturing apparatus, including:

the above-described thread material cutting device;

tag feed means for feeding tags to the carrying face of the carrier;

thread material feed means for feeding a thread material so as to be placed over a plurality of the tags retained on the carrying face of the carrier;

welding means for welding the tags and the thread material on the carrier;

sheet feed means for feeding a sheet onto the tags and the thread material on the carrier; and welding means for welding the tags or the thread material to the sheet.

Advantageous Effects of Invention

The thread material cutting device of the present invention can be used while being incorporated in an extraction bag sheet manufacturing apparatus. When extraction bags are manufactured from an extraction bag sheet which is manufactured by an extraction bag sheet manufacturing apparatus with the thread material cutting device of the present invention being incorporated therein, the obtained extraction bags can be used without the necessity of stripping the thread material from a transverse seal portion. Accordingly, even when the extraction bags are made from biodegradable plastic, the problem of the water filter sheet being torn at the time of using the extraction bags is solved.

Moreover, according to the thread material cutting device of the present invention, the thread material is cut off by application of tension to the thread material at the time of welding the tags and the thread material. This eliminates the need of a cutter, and a running cost of the apparatus relating to maintenance of a cutter blade can be reduced. Furthermore, since the thread material cutting device of the present invention utilizes the thread material in the state of being easy to melt-cut at the time when the tags and the thread material are welded, a compact apparatus configuration is achieved.

DESCRIPTION OF EMBODIMENTS

Figure 1:
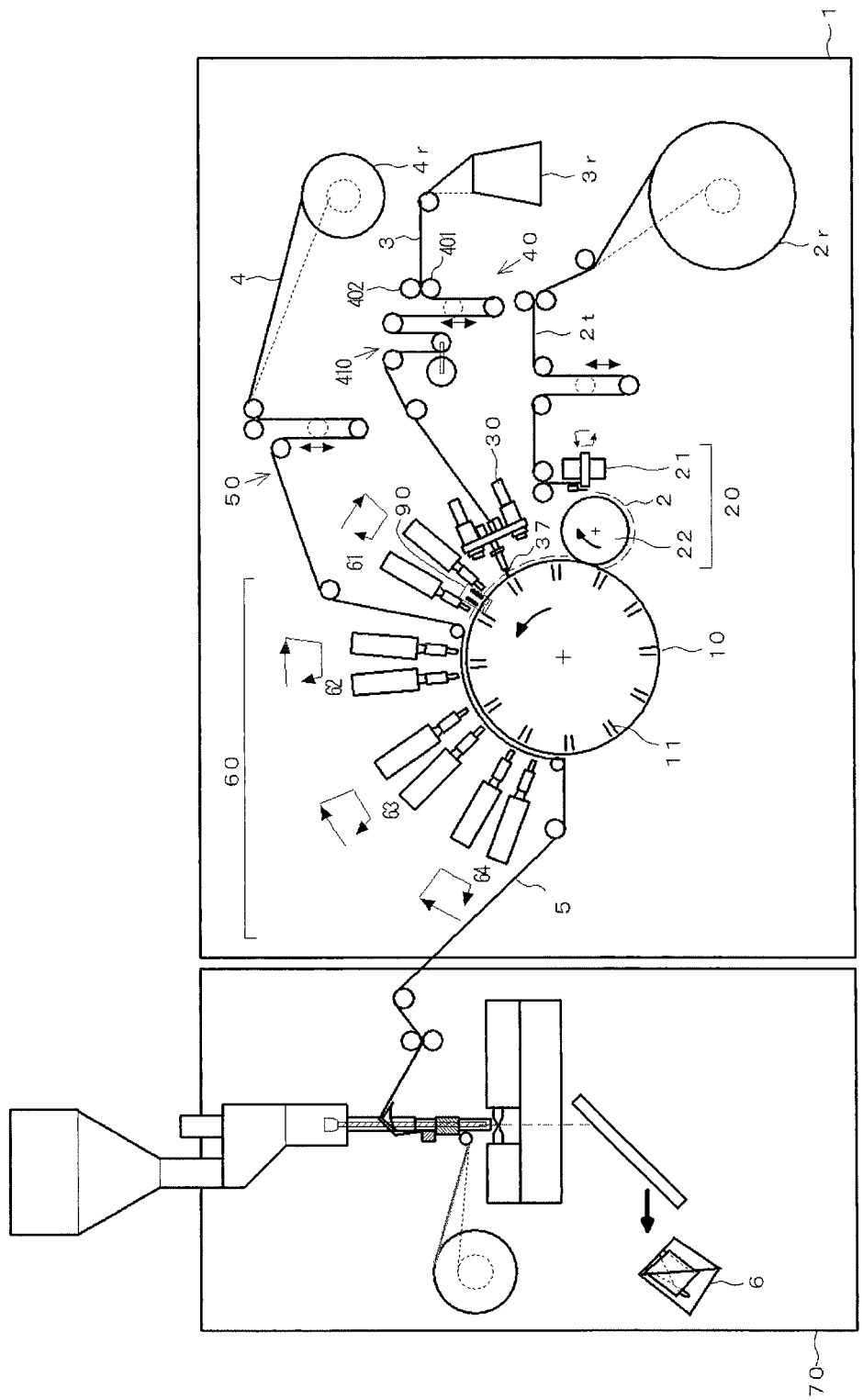
FIG. 1 is an overall configuration view of an extraction bag sheet manufacturing apparatus including a thread material cutting device of an embodiment, and a packing machine.

Hereinafter, the present invention will be described in detail with reference to the drawings. Note that identical or similar component members are designated by identical reference numerals throughout the respective drawings.

FIG. 1 is an overall configuration view of an extraction bag sheet manufacturing apparatus 1 in one embodiment of the present invention including a thread material cutting device in one embodiment of the present invention and a packing machine 70 provided so as to be connected to the extraction bag sheet manufacturing apparatus 1.

Figure 2:
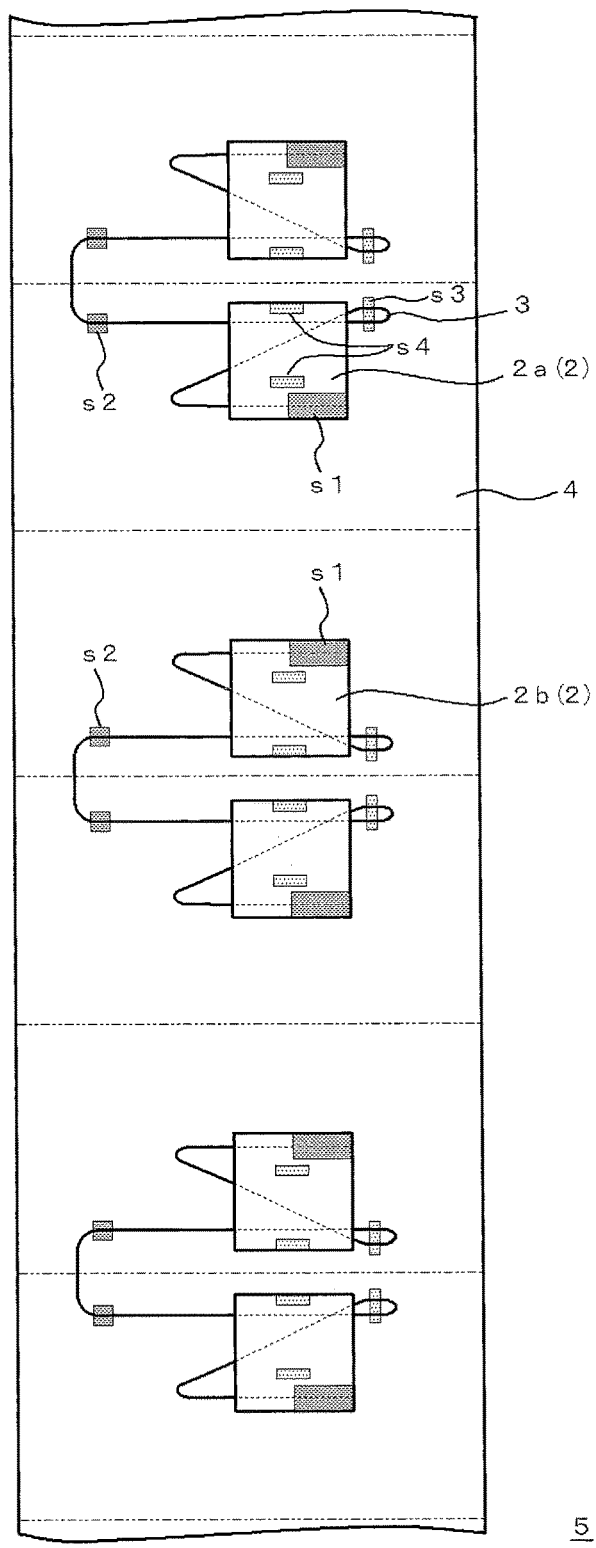
FIG. 2 is a plan view of an extraction bag sheet manufactured by the extraction bag sheet manufacturing apparatus of FIG. 1.

As illustrated in FIG. 2, the extraction bag sheet manufacturing apparatus 1 manufactures an extraction bag sheet 5 in which tags 2 welded to a thread material 3 are arranged at prescribed intervals in a longitudinal direction of a water filter sheet 4. In FIG. 2, a two-dot chain line represents a portion where horizontal sealing is performed. Each region sectioned by the two-dot chain lines serves as one extraction bag.

In the extraction bag sheet 5, a pair of tags 2a and 2b include strong seal portions s1 where the tag 2 and the thread material 3 are strongly welded so as not to be detached in a general usage state of the extraction bag. Such pairs of the tags 2a and 2b are repeatedly arranged in the longitudinal direction of the water filter sheet 4, with the thread material 3 being severed in a horizontal sealing portion in between the pair of tags 2a and 2b.

As shown in FIG. 1, the extraction bag sheet manufacturing apparatus 1, which is similar in overall configuration to the extraction bag sheet manufacturing apparatus disclosed in Patent Literatures 1 and 2, includes a rotary carrier 10 which rotates in a direction of an arrow, a tag feeder 20 which feeds the tags 2 at prescribed intervals to a peripheral face that is a carrying face of the rotary carrier 10, a thread guiding mechanism 40 including a thread guiding device 30 which forms a continuous pattern of the thread material 3 on the peripheral face of the rotary carrier 10 on which the tags 2 are arranged at prescribed intervals, a sheet feeder 50 which feeds a water filter sheet 4 onto the tags 2 and the thread material 3 on the rotary carrier 10, and a sealing device 60 which bonds the tag 2 and the thread material 3, bonds the tag 2 and the water filter sheet 4, or sequentially bonds the thread material 3 and the water filter sheet 4.

Like the conventional packing machine, the packing machine 70 provided in the downstream of the extraction bag sheet manufacturing apparatus 1 also manufactures tetrahedral bags with use of the extraction bag sheet 5 that is manufactured by the extraction bag sheet manufacturing apparatus 1 and to also fill the bags with contents, such as tea leaves, to manufacture extraction bags 6.

The respective devices that constitute the extraction bag sheet manufacturing apparatus 1, i.e., the rotary carrier 10, the tag feeder 20, the thread guiding mechanism 40, the sheet feeder 50, and the sealing device 60, may have configuration generally the same as the extraction bag sheet manufacturing apparatus disclosed in Patent Literatures 1 and 2.

For example, the rotary carrier 10 continuously rotates in a direction of an arrow in FIG. 1 during operation of the apparatus 1. The outer circumference of the rotary carrier 10 is divided into 24 subdivisions, and each subdivision includes two portions mounting tags 2 and provided so as to be adjacent to each other. The mounting portion of the tag 2 on the rotary carrier 10 has a mechanism provided to change suction channels so as to suck and thereby carry the tag 2. The rotary carrier 10 also includes a vertical moving mechanism for a thread guiding pin 11. In the vertical moving mechanism, the pin 11 is biased by a spring so as to constantly protrude from the peripheral face of the rotary carrier. However, in a region where the water filter sheet 4 is fed to the peripheral face of the rotary carrier 10, the pin 11 is withdrawn toward the inside of the rotary carrier along the shape of a fixed cam provided inside the rotary carrier 10, so that a protrusion amount of the pin 11 from the peripheral face is made small.

The tag feeder 20 comprises a tag cut feeder 21 which unreels a tag tape 2t from a tag tape web 2r which is made of a rolled tag tape 2t and cuts the tape into the tags 2 of a specified length, and a tag delivery drum 22 which transfers the tags 2 that have been cut by the tag cut feeder 21 to the peripheral face of the rotary carrier 10.

The tag feeder 20 cuts the tag tape 2t while oscillating the tag cut feeder 21 with a cam mechanism as shown with arrows so that the tags 2 can be fed from the tag tape web 2r to the rotary carrier 10 as fast as possible without slacking the tag tape 2t. The tag feeder 20 also delivers the cut tags 2 to the tag delivery drum 22. The tag delivery drum 22 rotates at constant speed and causes the rotary carrier 10 to carry the tags 2, which have been delivered from the tag cut feeder 21, at prescribed intervals.

Figure 3:
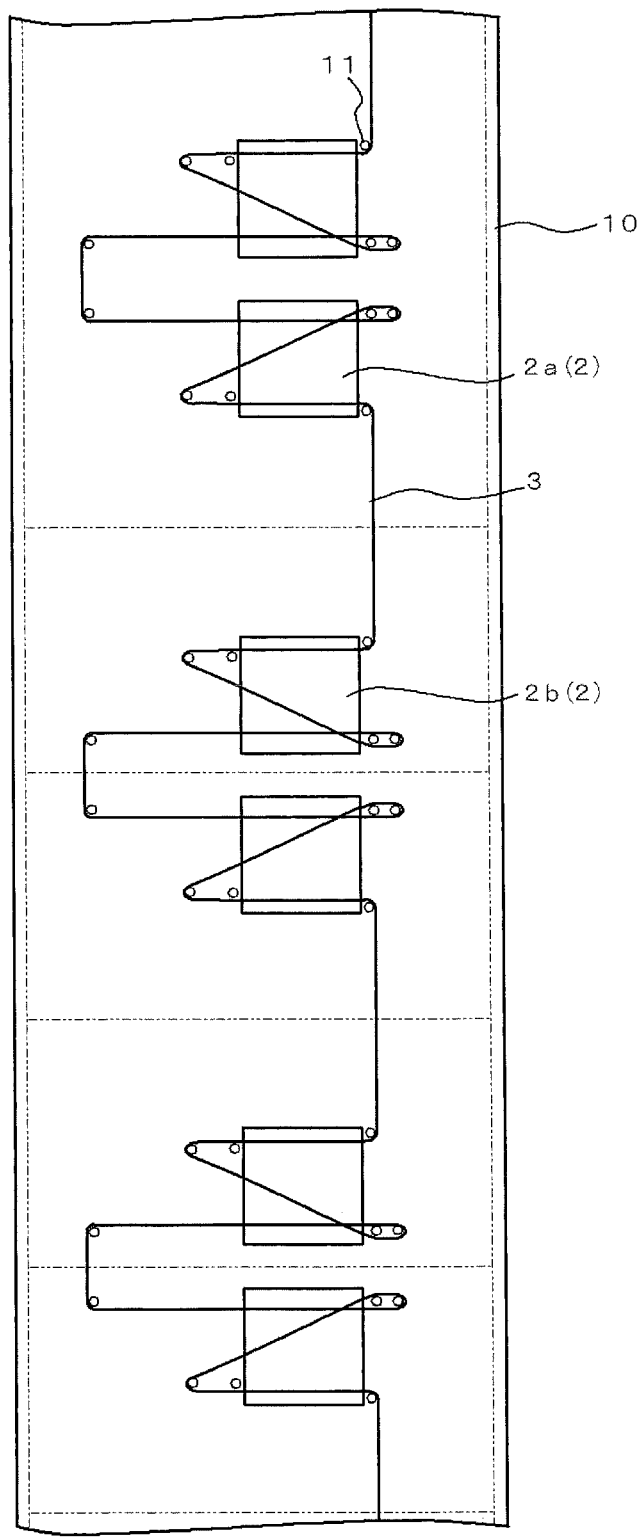
FIG. 3 is a plan view of a continuous winding pattern of a thread material formed by the extraction bag sheet manufacturing apparatus of FIG. 1.

The thread guiding mechanism 40 is configured to form a continuous winding pattern of the thread material 3, as illustrated in FIG. 3, on the peripheral face of the rotary carrier 10 on which the tags 2 are arranged at prescribed intervals, while adjusting tension of the thread material 3 to be generally constant. The thread guiding mechanism 40 includes a driving roller 401 which unreels the thread material 3 from the thread material web 3r, a nip roller 402 facing the driving roller 401, tension adjustment means 410 for the thread material 3, and a thread guiding device 30 which forms a continuous winding pattern of the thread material 3 on the peripheral face of the rotary carrier 10. The thread guiding device 30 moves a threader 37 at the top end by using two crank mechanisms so as to guide a thread to the thread guiding pin 11 which protrudes from the peripheral face of the rotary carrier 10.

The sheet feeder 50 unreels and feeds the sheet 4 from a sheet web 4r which is made of a rolled sheet 4, so that the sheet 4 is placed on the tags 2 carried on the rotary carrier 10 at prescribed intervals and on the pattern of the thread material 3 formed on the tags 2. More specifically, a water filter sheet is used as the sheet 4.

The sealing device 60 includes a first sealing device 61 which strongly seals the tags 2 and the thread material 3, which are carried on the rotary carrier 10, at a seal portion s1 illustrated in FIG. 2 before the water filter sheet 4 is fed onto the rotary carrier 10; a second sealing device 62 which strongly seals the thread material 3 and the water filter sheet 4 at a portion s2 where the thread material 3 is separated away from the tag 2 in each region corresponding to one extraction bag, after the water filter sheet 4 is fed onto the rotary carrier 10; a third sealing device 63 which weakly seals the thread material 3 and the water filter sheet 4 at a portion s3 where the direction of the thread material 3 is changed in the vicinity of the tag 2; and a fourth sealing device 64 which weakly seals the tag 2 and the water filter sheet 4 at a seal portion s4.

Here, the phrase "strongly sealed" refers to the seal portion being firmly sealed so as not to be detached in general use of the extraction bags, whereas "weakly sealed" refers to the seal portion being weakly sealed so that the seal portion can be easily detached when the extraction bags are used. In the drawing, hatching frames that surround the seal portions s1, s2, s3, and s4 illustrate the regions which come into contact with seal heads.

Although examples of the seal means in these sealing devices 60 (61, 62, 63, 64) may include ultrasonic welding and heat welding, the ultrasonic welding is preferable since melted sheet residue is less likely to adhere to the sealing devices 60.

Moreover, in these sealing devices 60, it is preferable to provide a servo motor as a driving source separately from the driving source of the rotary carrier 10, so that the sealing devices 60 are moved in a vertical direction with respect to the peripheral face of the rotary carrier 10. It is more preferable to move the sealing devices 60 as shown with the arrows illustrated in FIGS. 1 and 4, in synchronization with the rotation of the rotary carrier 10. Consequently, duration of contact between the seal heads of the sealing devices 60 and sealing targets including the tags, the thread material or the water filter sheet is prolonged. This makes it possible to easily set optimal seal conditions and to set proper seal conditions when these materials are changed.

Figure 4:
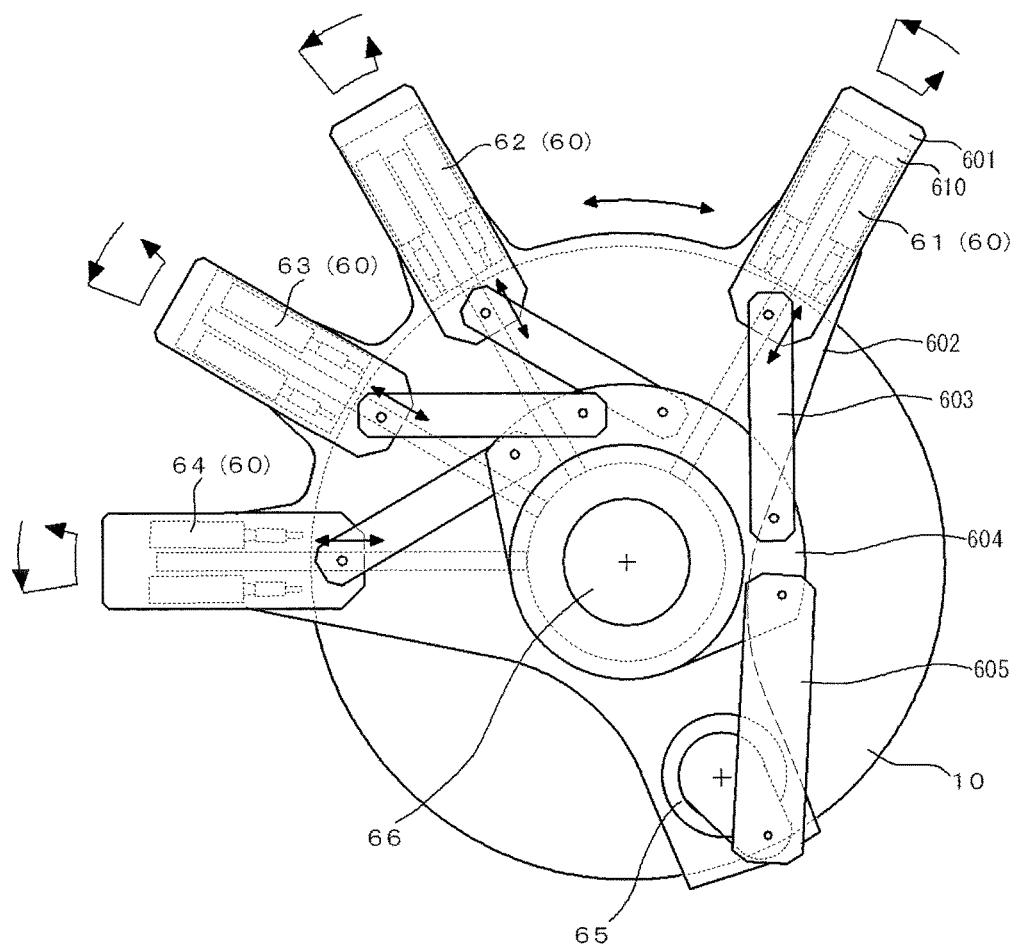
FIG. 4 is a rear view of the vicinity of a rotary carrier in the extraction bag sheet manufacturing apparatus of FIG. 1.

More specifically, the sealing device 60 is configured as illustrated in FIG. 4. The sealing devices 61, 62, 63, and 64 are each mounted on seal head fixing plates 610 via air cylinders (not illustrate), the seal head fixing plates 610 are mounted on seal heat mounting plates 601, and the seal head mounting plates 601 are mounted on an oscillation plate 602 oscillatably in a radial direction of the rotary carrier 10. Each of the seal head mounting plates 601 is connected to a vertically movable plate 604 through a rod link 603, and the vertically movable plate 604 is further connected to a seal head vertical driving servo motor 65 through a rod link 605. The oscillation plate 602 is also driven by a seal head oscillation servo motor 66. Note that the seal head vertical driving servo motor 65 and the seal head oscillation servo motor 66 are provided separately from the rotary carrier servo motor, and their driving is controlled by a controller so that they are driven at specified rotation speed and rotation direction with a timing calculated in advance in accordance with the winding pattern of the thread material 3, the rotation speed of the rotary carrier 10, the necessary pressure-welding time, and the like.

Figure 5A:
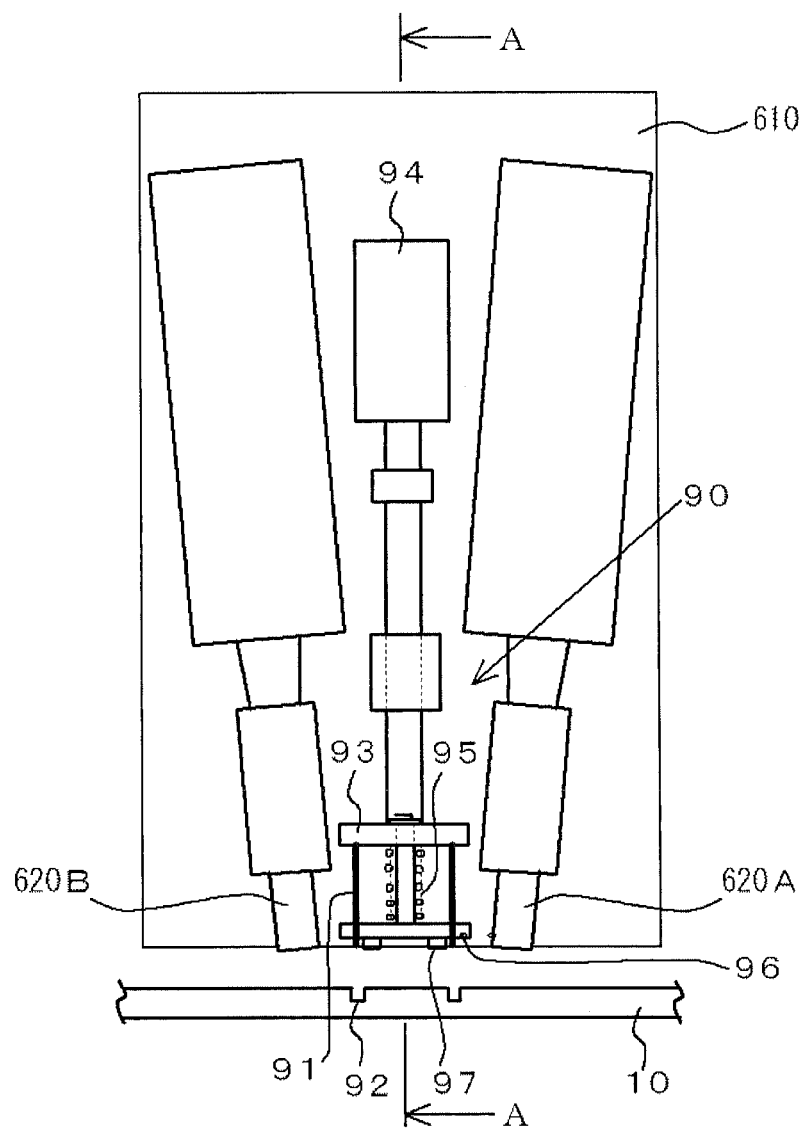
FIG. 5A is a front view of a first sealing device in the state before welding of the tags and the thread material.
Figure 5B:
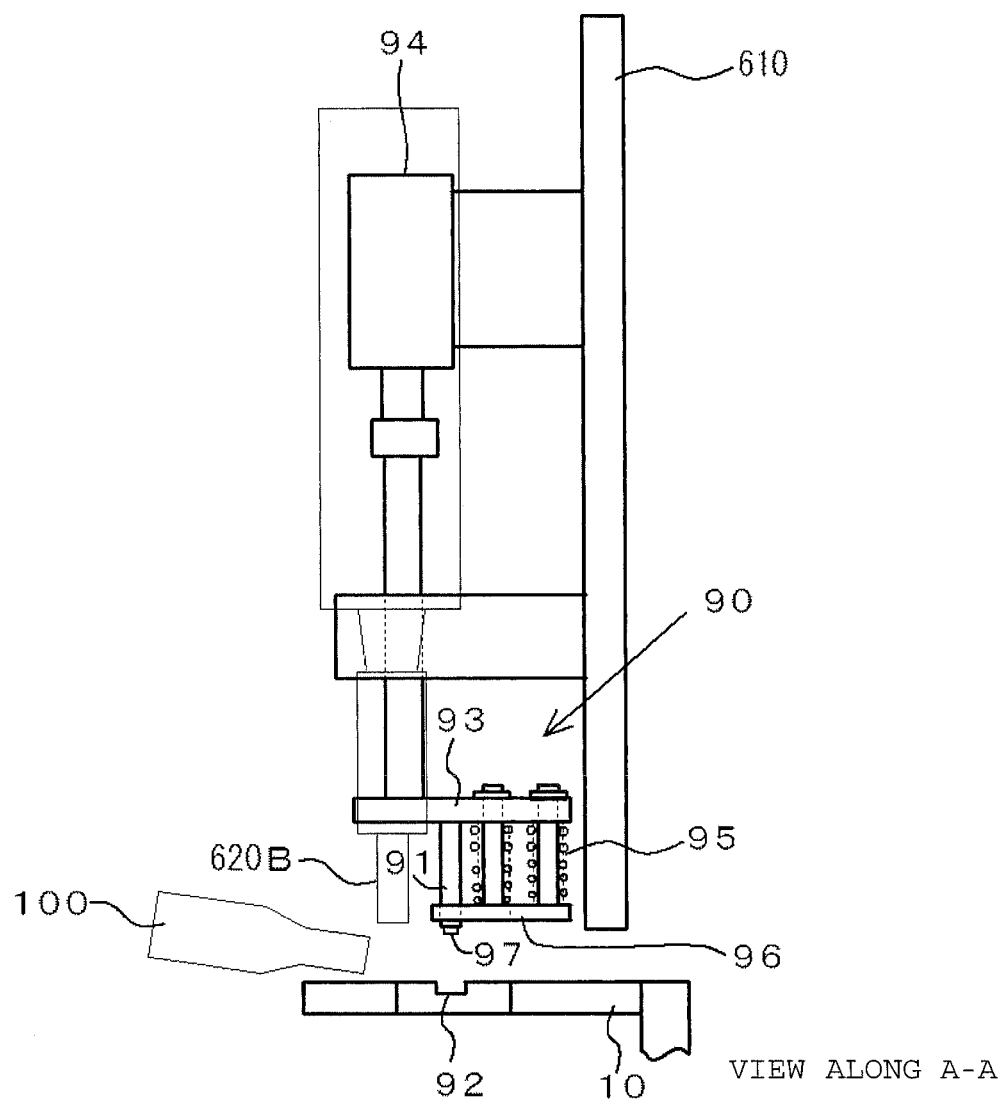
FIG. 5B is a cross sectional view of the first sealing device along line A-A in FIG. 5A.
Figure 5C:
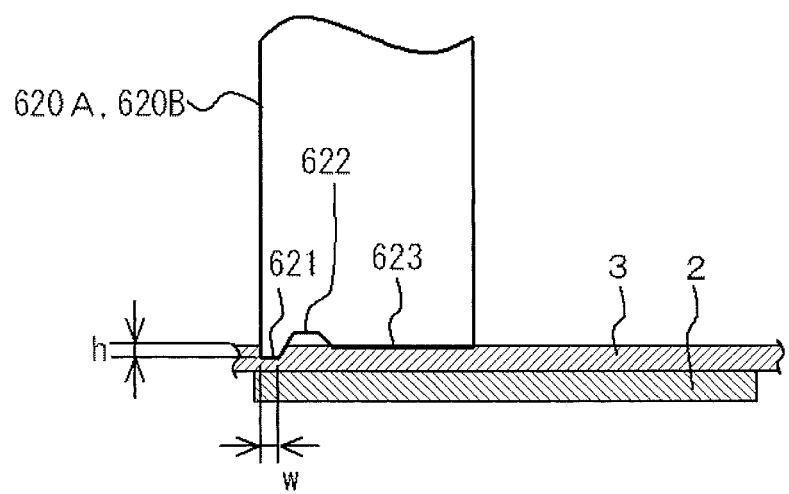
FIG. 5C is a cross sectional view of a front end of a seal head.

FIG. 5A is a front view of the first sealing device 61 in the state before welding, and FIG. 5B is a cross sectional view along line A-A. In the first sealing device 61, a seal head 620A which executes ultrasonic welding of the tag 2 and the thread material 3 at the strong seal portion s1 of the tag 2a of FIG. 2 and a seal head 620B which executes ultrasonic welding of the tag 2 and the thread material 3 at the strong seal portion s1 of the tag 2b which is adjacent to the strong seal portion s1 of the tag 2a are mounted on the seal head fixing plate 610. Accordingly, strong sealing of the tag 2 and the thread material 3 is simultaneously performed in the adjacent tags 2a and 2b. As illustrated in FIG. 5C, on a top end surface of an ultrasonic horn which forms each of these seal heads 620A and 620B, a protruding portion 621 is formed at the edge of the side where the thread material 3 should be cut off, and on the inner side, a recess portion 622 is formed adjacent to the protruding portion 621. A horn surface 623 for welding the tag 2 and the thread material 3 is formed in other portions. The protruding portion 621 slightly projects toward the rotary carrier 10 from the horn surface 623 by, for example, a height h of about 0.1 mm. Even though the protrusion amount is as small as such, the thread material 3 is bitten into the protruding portion 621 when the tag 2 and the thread material 3 are welded, and pressure is applied to the horn surface 623, which makes it easier to cut the thread material 3. Moreover, since the recess portion 622 is formed adjacent to the protruding portion 621, the recess portion 622 functions as an escape portion of the melted thread material 3, so that the melted thread material 3 is prevented from bulging out from the protruding portion 621. Note that the top end surface of the ultrasonic horn may be formed into various shapes, such as a flat shape without the protruding portions 621 and the recess portions 622 and a shape having either the protruding portion 621 or the recess portion 622, in accordance with the materials and the like of the tag 2 and the thread material 3 to be welded. Moreover, while the protruding portion 621 may be formed into a flat surface with a width w of about 0.2 mm, the protruding portion 621 may have a top end being sharpened like a cutting tool.

Moreover, as illustrated in FIGS. 5A and 5B, a thread material cutting device 90 of the present embodiment is assembled in between two seal heads 620A and 620B. The thread material cutting device 90 has tension application means which applies tension to the thread material 3 placed between the tags 2a and 2b while the two seal heads 620A and 620B are welding the tags 2a and 2b with the thread material 3, respectively. The tension application means includes a pair of pressing plates 91 which press the thread material 3, which is placed between these tags, toward the inside of the rotary carrier 10, and a pair of recess portions 92 formed on the surface of the rotary carrier 10 so that the pressing plates 91 can be inserted therein.

The pair of pressing plates 91 are mounted on a pressing plate mounting plate 93, the pressing plate mounting plate 93 is connected to an air cylinder 94, and the air cylinder 94 is mounted on the seal head fixing plate 610 together with the seal heads 620A and 620B.

A spring material support member 96 is provided on the pressing plate mounting plate 93 at the side of the rotary carrier 10 via a spring material 95, and further a pair of thread material fixing means 97 project from the spring material support member 96 at the side of the rotary carrier 10. While the seal heads 620A and 620B are pressing the tags 2 and the thread material 3 with oscillation of the seal head fixing plate 610, the thread material fixing means 97 presses the thread material 3 to the rotary carrier 10 on the opposite side of the pressing positions across the recess portions 92.

In the vicinity of the pair of recess portions 92, a suction pipe 100 is provided as means to suck and remove the thread material 3, which has been cut off with the thread material cutting device 90, from the surface of the rotary carrier 10.

Figure 7:
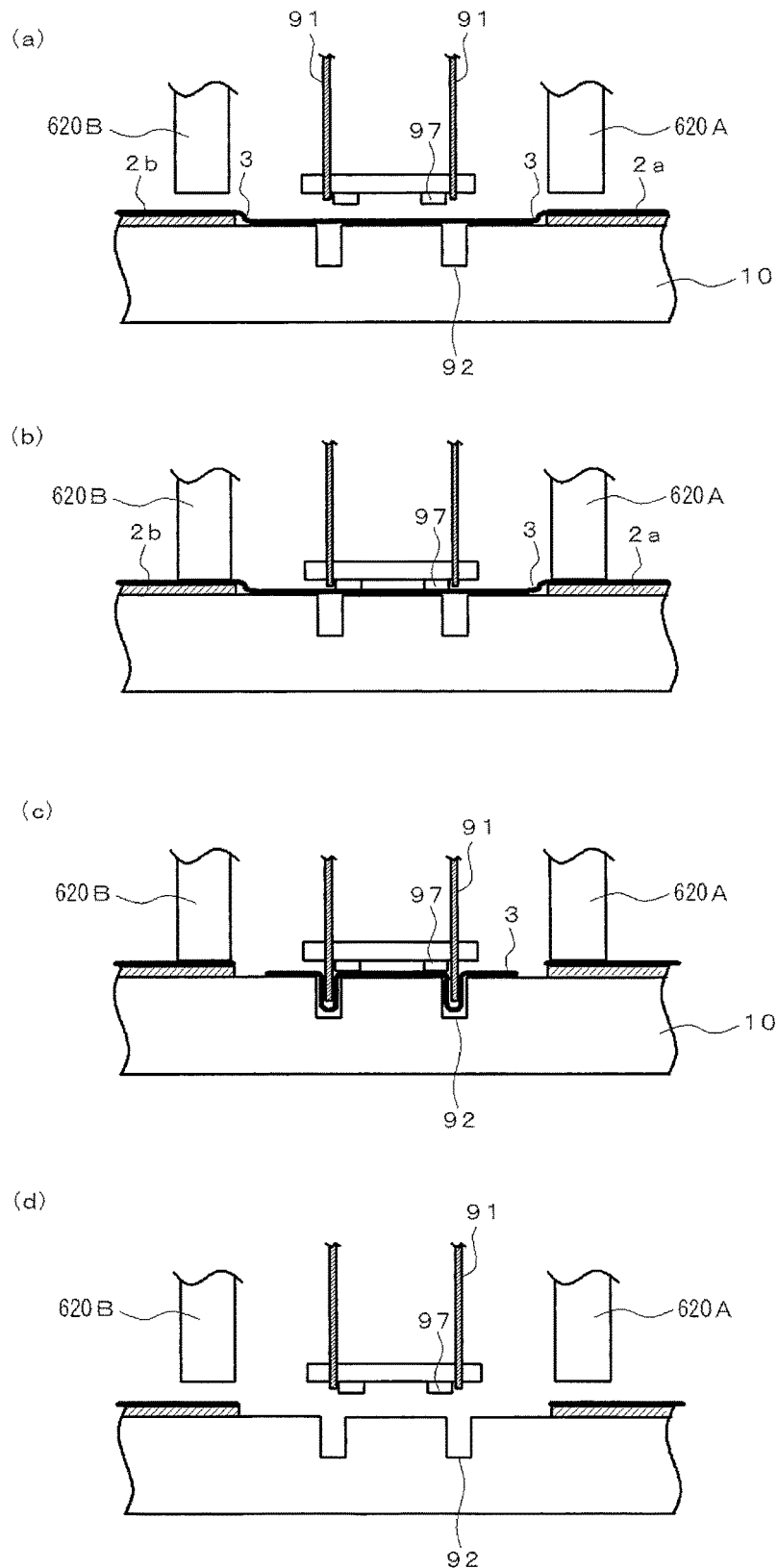
FIG. 7 is a process chart describing welding of tags and a thread and cutting of a thread material.
Figure 9:
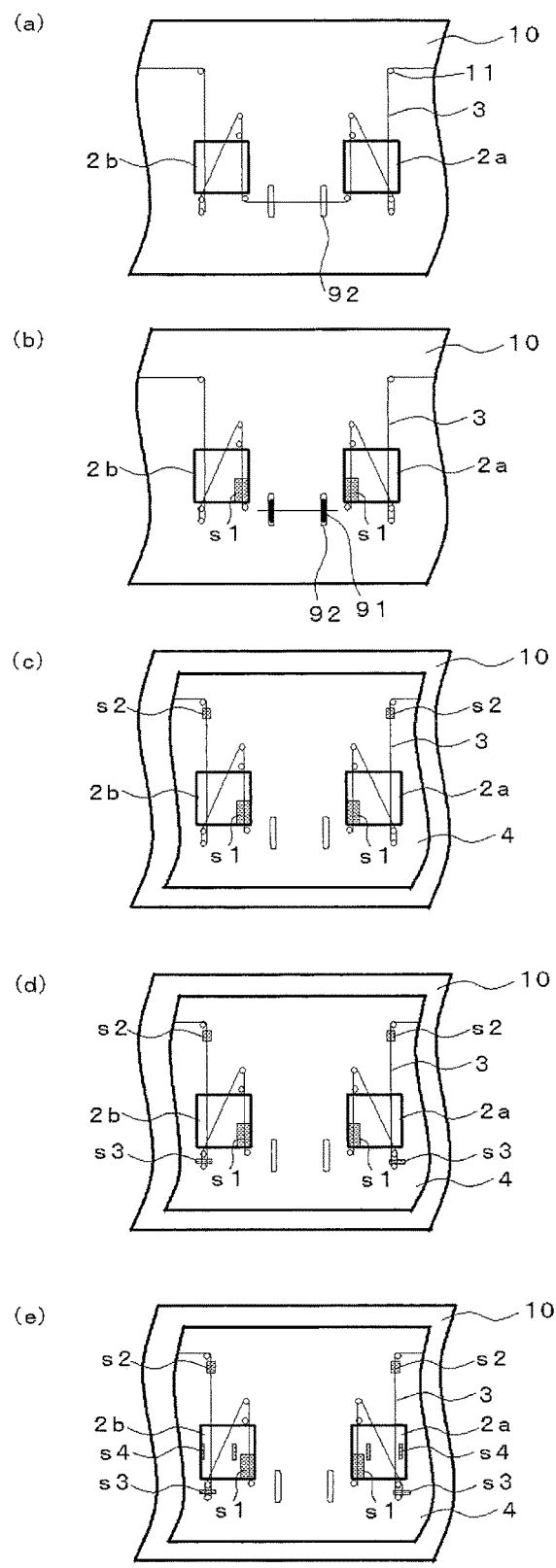
FIG. 9 is a process chart describing welding of tags and a thread, cutting of a thread material, and welding of the tags or the thread material to a water filter sheet.

The thread material cutting device 90 is operated as illustrated in FIG. 7 when the first sealing device 61 is in operation. In the extraction bag sheet manufacturing apparatus 1 including the thread material cutting device 90, welding of the tag 2 with the thread material 3, cutting of the thread material 3, and welding of the tag 2 or the thread material 3 with the water filter sheet 4 are performed as illustrated in FIG. 9.

First, the tags 2 are carried on the rotary carrier 10 at prescribed intervals by the tag feeder 20, and the thread material 3 is placed over the tags 2 while being guided onto the pins 11 by the thread guiding mechanism 40 (FIGS. 7(a) and 9(a)). Next, in the pair of tags 2a and 2b in which the strong seal portions Si of the tag 2 and the thread material 3 are made to face each other (see FIG. 2), the strong seal portions s1 are welded by the seal heads 620A and 620B of the first sealing device 61. In this welding, the seal head fixing plate 610 oscillates around the rotary carrier 10, so that the seal heads 620A and 620B press the tags 2a and 2b and the thread material 3. The thread material fixing means 97 also presses the thread material 3 onto the surface of the rotary carrier 10 with oscillation of the seal head fixing plate 610 (FIG. 7(b)).

Figure 6A:
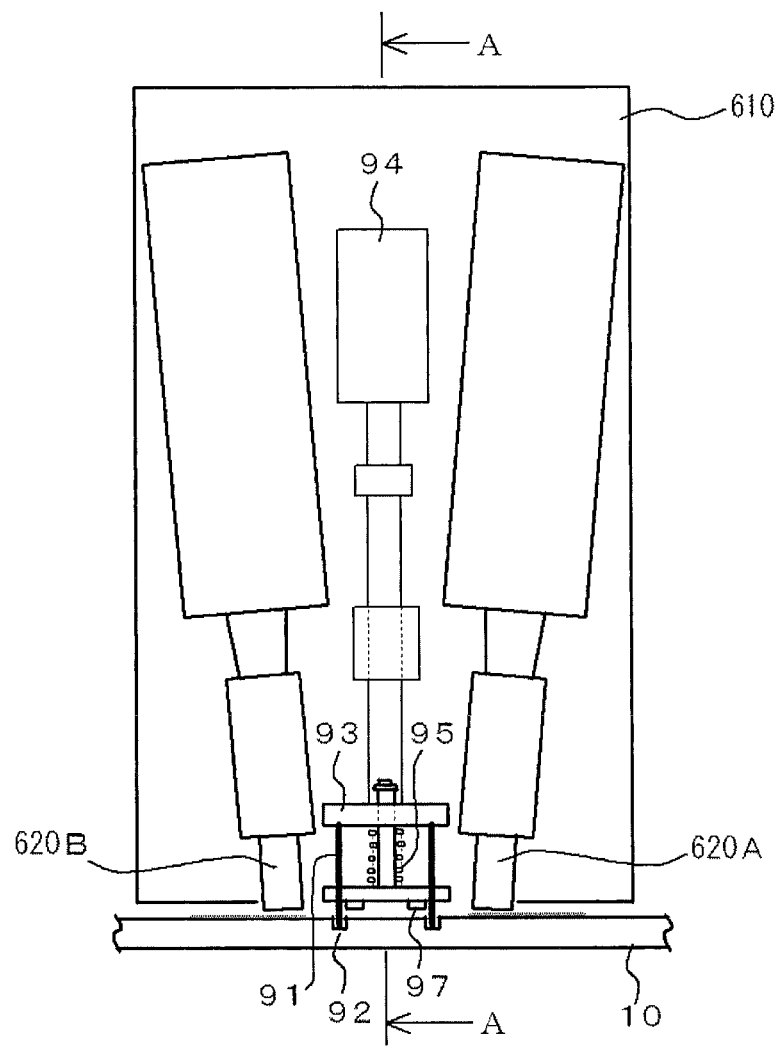
FIG. 6A is a front view of the first sealing device at the time of welding the tags and the thread material.
Figure 6B:
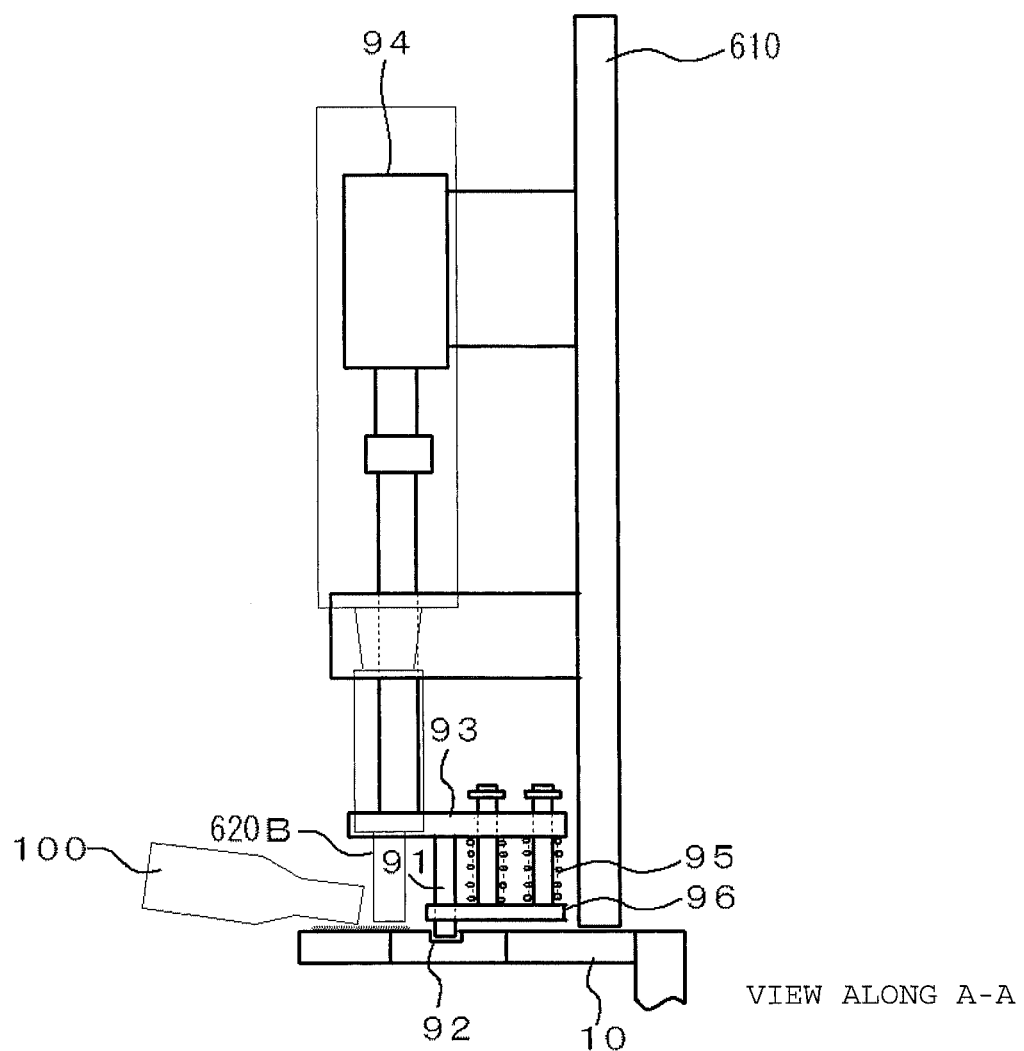
FIG. 6B is a cross sectional view of the first sealing device along line A-A in FIG. 6A.

Here, the thrust of the seal heads 620A and 620B is adjusted with an air cylinder (not illustrated). Next, once the thread material 3 is melted with the heat from ultrasonic welding by the seal heads 620A and 620B, the pressing plate mounting plate 93 is pressed down by the air cylinder 94 as illustrated in FIG. 6A and FIG. 6B. Consequently, the pressing plate 91 is pressed into the recess portion 92, and the spring material 95 is contracted, so that the thrust against the thread material 3 is applied to the thread material fixing means 97. At this point of time, the thread material 3 is to be easily melt-cut from the heat of ultrasonic welding by the seal heads 620A and 620B. More preferably, the protruding portion 621 is formed at the edge of the top end surface of the ultrasonic horn on the cutting side of the thread material 3. Accordingly, when tension is applied to the thread material 3 by pressing of the pressing plate 91 into the recess portion 92, the thread material 3 is cut off (FIGS. 7(c) and 9(b)). Particularly when the pressing plate 91 is pressed into the recess portion 92 in the state where the thread material 3 is pressed onto the rotary carrier 10 side by the seal heads 620A and 620B and the thread material fixing means 97, strong tension is applied to the thread material 3. As a result, the thread material 3 which is easy to melt-cut with the heat of ultrasonic welding by the seal heads 620A and 620B is cut off at the edge of the seal heads 620A and 620B. This prevents cut residue of the thread material 3 from projecting from the tag 2. Therefore, the extraction bags 6 manufactured from the extraction bag sheet 5 which is obtained by the extraction bag sheet manufacturing apparatus 1 have good appearance.

Next, when the pressing plate 91 pressed by the air cylinder 94 is released, the pressing plate 91 is lifted from the recess portion 92. Upon release of the pressing by the air cylinder 94, the pressing plate mounting plate 93 also goes up and the contracted spring material 95 expands, so that the thrust of the thread material fixing means 97 with respect to the thread material 3 is reduced. Further, the seal heads 620A and 620B and the thread material fixing means 97 go up with oscillation of the seal head fixing plate 610.

Then, the cut thread material 3 is sucked and removed from the surface of the rotary carrier 10 by the suction pipe 100 (FIG. 7(d)).

Figure 10:
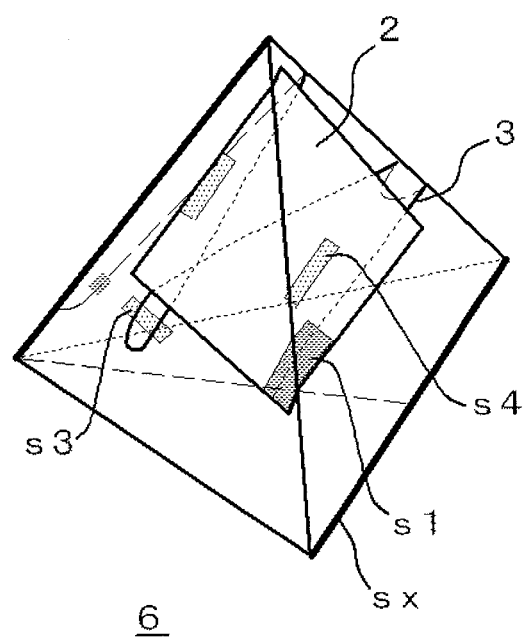
FIG. 10 is a perspective view of an extraction bag manufactured from an extraction bag sheet which is manufactured by the extraction bag sheet manufacturing apparatus.

In the extraction bag sheet manufacturing apparatus 1, welding of the tag 2 and the thread material 3 and cutting of the thread material 3 are performed in this manner, and then according to the descriptions in Patent Literatures 1 and 2, the water filter sheet 4 is fed onto the tags 2 and the thread material 3 on the rotary carrier 10. The thread material 3 and the water filter sheet 4 are then strongly sealed at the strong seal portion s2 by the second sealing device 62 (FIG. 9(c)), the thread material 3 and the water filter sheet 4 are weakly sealed at the weak seal portion s3 by the third sealing device 63 (FIG. 9(d)), and the tag 2 and the water filter sheet 4 are weakly sealed by the fourth sealing device 64 (FIG. 9(e)). Thus, in between the pair of tags 2a and 2b in which the strong seal portions s1 of the tag 2 and the thread material 3 are made to face each other on the manufactured extraction bag sheet 5, the thread material 3 is removed from a portion which is horizontally sealed at the time of manufacturing extraction bag as illustrated in FIG. 2. In particular, the thread is removed from the edge of the welding portion of the tag 2 and the thread material 3. Therefore, as illustrated in FIG. 10, the extraction bag 6 manufactured from the above sheet does not have the thread material 3 which should be removed from a horizontal seal portion sx when the tag 3 is stripped from a bag body at the time of using the extraction bag 6, and therefore is free from the problem of the torn bag body. The extraction bag 6 also has good appearance since the end portion of the thread material 3 also does not project from the tag 2.

Note that the water filter sheet, the tag, and the thread material, which are the same as those in the conventional case, may be used when the thread material cutting device is incorporated into the extraction bag sheet manufacturing apparatus. However, in the viewpoint of enhancing the significance of the effect of the present invention in particular, it is preferable to use fabrics or nonwoven fabrics which are formed from biodegradable plastics, such as polylactic acid (PLA) and polybutylene succinate (PBS), with a weight basis of 10 to 30 g/m$^2$, as the water filter sheet, it is preferably to use a paperboard laminated with biodegradable plastics, such as polylactic acid (PLA) and polybutylene succinate (PBS), as the tag, and it is preferable to use a thread made from biodegradable plastics, such as polylactic acid (PLA) and polybutylene succinate (PBS), and/or a thread formed by properly mixing a biodegradable plastic and cotton, as the thread material.

Figure 8:
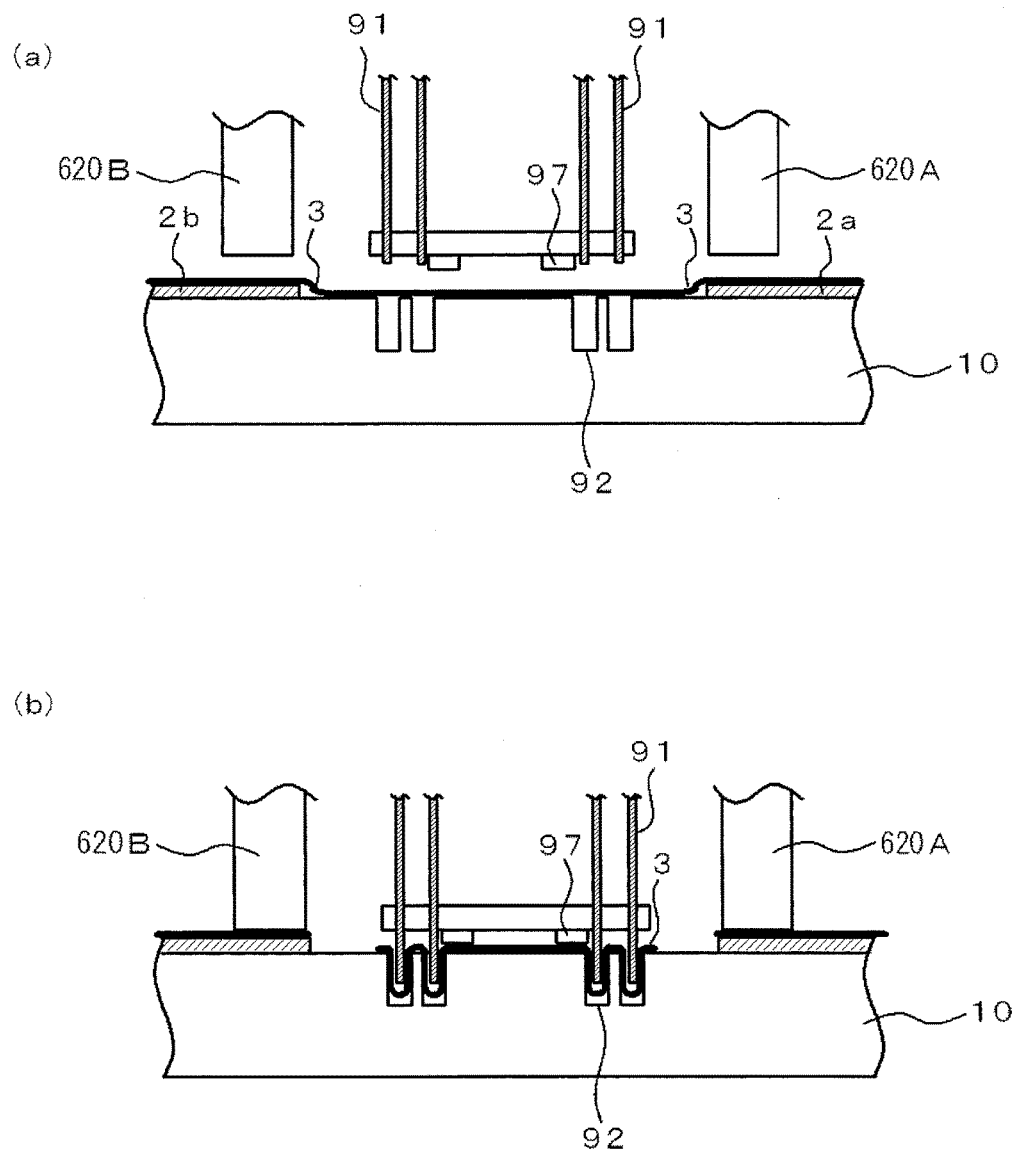
FIG. 8 is an explanatory view illustrating actions in welding of tags and a thread and cutting of a thread material according to a modified aspect of the first sealing device.

The thread material cutting device of the present invention can be embodied in various modes. For example, as illustrated in FIG. 8(a), a pair of pressing plates 91 may each be arranged on the opposite sides of the seal heads 620A and 620B across the portions of the thread material 3 to be melt-cut. Along with this arrangement, a pair of recess portions 92 may also be formed at each position. Accordingly, even when the pressing amount of each pressing plate 91 is the same, the distance of the thread material 3 to be pulled becomes longer and the tension applied to the thread material 3 becomes stronger as compared with the case where one pressing plate 91 is each arranged as illustrated in FIG. 7(a). Therefore, even if the thread material 3 tends to extend depending on the material of the thread material 3 at the time when the tag 2 and the thread material 3 are welded, the thread material 3 can be reliably cut off.

Moreover, the thread material cutting device of the present invention may be configured to cut the thread material 3 simultaneously in the adjacent tags 2a and 2b in which the strong seal portions s2 sealing the tag 2 and the thread material 3 are made to face each other, or may be configured to cut the thread material 3 sequentially in the adjacent tags 2a and 2b. Therefore, the first sealing device 61 which welds the tags 2 and the thread material 3 may include not the pair of pressing plates 91 but one pressing plate 91.

The tension application means which applies tension to the thread material at the time of welding the tags and the thread material is not limited to the means which presses the thread material 3 into the rotary carrier 10 but may be means which, for example, pulls the thread material 3 in the direction parallel to the surface of the rotary carrier 10.

The thread material fixing means 97 may be omitted if the thread material 3 can be cut off at the time of welding the tags 2 and the thread material 3 by the tension applied to the thread material 3 by the pressing plate 91 and the like.

The carrier on which welding of the tags and the thread material is performed is not limited to the drum-like rotary carrier but may be a conveyor-like carrier having a flat conveyance path.

The device for removing the cut thread material 3 from the surface of the carrier is not limited to the suction pipe provided on the carrier. Such means for sweeping the thread material 3 from the carrier surface and means for blowing the thread material 3 away from the carrier surface may be provided instead. Further, the removing device may be omitted depending on the configuration of the tension application means and the like in the thread material cutting device.

INDUSTRIAL APPLICABILITY

The thread material cutting device of the present invention is used while being incorporated in an extraction bag sheet manufacturing apparatus which is used in a product line to continuously manufacture extraction bags, such as tea bags of black tea, green tea, herb tea and the like, as well as extraction bags of soup such as dried sardine and dried bonito. The thread material cutting device is useful as a device for cutting unnecessary thread materials when tags and a thread material are welded.

REFERENCE SIGNS LIST

1 Extraction bag sheet manufacturing apparatus
2 Tag
2a, 2b Pair of tag
2r Tag tape web
2t Tag tape
3 Thread material
3r Thread material web
4 Sheet or water filter sheet
4r Sheet web
5 Extraction bag sheet
6 Extraction bag
10 Rotary carrier
11 Pin
20 Tag feeder
21 Tag cut feeder
22 Tag delivery drum
30 Thread guiding device
37 Threader
40 Thread guiding mechanism
   401 Driving roller
   402 Nip roller
   410 Tension adjustment means
   420 Dancer mechanism
   430 Pass length adjusting device
50 Sheet feeder
60 Sealing device
61 First sealing device
   610 Seal head fixing plate
   620A, 620B Seal head
   621 Protruding portion
   622 Recess portion
   623 Horn surface 62 Second sealing device
63 Third sealing device
64 Fourth sealing device
70 Packing machine
90 Thread material cutting device
91 Pressing plate
92 Recess portion
93 Pressing plate mounting plate
94 Air cylinder
95 Spring material
96 Spring material support member
97 Thread material fixing means
100 Suction pipe
s1 Strong seal portion of tag and thread material
s2 Strong seal portion of thread material and water filter sheet
s3 Weak seal portion of thread material and water filter sheet
s4 Weak seal portion of tag and thread material
sx Horizontal seal portion

The invention claimed is:

1. An extraction bag sheet manufacturing apparatus, comprising:
   a thread material cutting device;
   tag feed means for feeding tags to a carrying face of a carrier;
   thread material feed means for feeding a thread material so as to be placed over a plurality of the tags retained on the carrying face of the carrier;
   welding means for welding the tags and the thread material on the carrier;
   sheet feed means for feeding a sheet onto the tags and the thread material on the carrier; and
   welding means for welding the tags or the thread material to the sheet, wherein:
      the thread material cutting device comprising tension application means configured to engage with the thread material placed between adjacent tags so as to apply tension to the thread material,
      while the welding means is welding the thread material to the tags, the tension application means applies tension to the thread material so as to cut the thread material, and
      the tension application means includes a recess portion formed in the carrying face of the carrier and a plate which can be inserted into the recess portion, and the plate is inserted into the recess portion when the welding means is welding the thread material to the tags.

2. An extraction bag sheet manufacturing apparatus, comprising:
   a thread material cutting device;
   tag feed means for feeding tags to a carrying face of a carrier;
   thread material feed means for feeding a thread material so as to be placed over a plurality of the tags retained on the carrying face of the carrier;
   welding means for welding the tags and the thread material on the carrier;
   sheet feed means for feeding a sheet onto the tags and the thread material on the carrier; and
   welding means for welding the tags or the thread material to the sheet, wherein:
      the thread material cutting device comprising tension application means configured to engage with the thread material placed between adjacent tags so as to apply tension to the thread material,
      while the welding means is welding the thread material to the tags, the tension application means applies tension to the thread material so as to cut the thread material,
      when the welding means simultaneously welds the thread material at the adjacent tags, the tension application means applies tension to the thread material being simultaneously welded at the adjacent tags so as to cut the thread material between the adjacent tags, and
      the tension application means includes a recess portion formed in the carrying face of the carrier and a plate which can be inserted into the recess portion, and the plate is inserted into the recess portion when the welding means is welding the thread material to the tags.

3. An extraction bag sheet manufacturing apparatus, comprising:
   a thread material cutting device;
   tag feed means for feeding tags to a carrying face of a carrier;
   thread material feed means for feeding a thread material so as to be placed over a plurality of the tags retained on the carrying face of the carrier;
   welding means for welding the tags and the thread material on the carrier;
   sheet feed means for feeding a sheet onto the tags and the thread material on the carrier; and
   welding means for welding the tags or the thread material to the sheet, wherein:
      the thread material cutting device comprising tension application means configured to engage with the thread material placed between adjacent tags so as to apply tension to the thread material,
      while the welding means is welding the thread material to the tags, the tension application means applies tension to the thread material so as to cut the thread material,
      the tension application means includes a recess portion formed in the carrying face of the carrier and a plate which can be inserted into the recess portion, and the plate is inserted into the recess portion when the welding means is welding the thread material to the tags, and
      the tension application means includes thread material fixing means for pressing a thread material to the carrier on an opposite side of a position where the thread material is welded to a tag on the carrier across the recess portion, and the thread material fixing means presses the thread material to the carrier while the welding means is welding the thread material to the tags.

* * * * *